(12) United States Patent
Parker

(10) Patent No.: US 7,558,870 B2
(45) Date of Patent: Jul. 7, 2009

(54) MULTIMEDIA CONTENT DELIVERY SYSTEM

(75) Inventor: Alistair John Parker, Quispamsis (CA)

(73) Assignee: Alcatel Lucent, Paris (FR)

( * ) Notice: Subject to any disclaimer, the term of this patent is extended or adjusted under 35 U.S.C. 154(b) by 866 days.

(21) Appl. No.: 11/061,577

(22) Filed: Feb. 22, 2005

(65) Prior Publication Data

US 2006/0190589 A1     Aug. 24, 2006

(51) Int. Cl.
  G06F 15/16     (2006.01)
  G06F 12/00     (2006.01)
(52) U.S. Cl. ...................................... 709/231; 709/236
(58) Field of Classification Search ......... 709/231–233, 709/236; 713/163; 725/74, 105
See application file for complete search history.

(56) References Cited

U.S. PATENT DOCUMENTS

| | | | |
|---|---|---|---|
| 6,400,847 B1 | 6/2002 | Li et al. | |
| 6,401,243 B1 | 6/2002 | Suzuki | |
| 6,532,233 B1 * | 3/2003 | Matsunaga et al. | 370/390 |
| 6,748,441 B1 * | 6/2004 | Gemmell | 709/231 |
| 6,795,863 B1 * | 9/2004 | Doty, Jr. | 709/231 |
| 6,973,081 B1 * | 12/2005 | Patel | 370/390 |
| 2002/0138500 A1 * | 9/2002 | Bechtel et al. | 707/104.1 |
| 2003/0195852 A1 * | 10/2003 | Campbell et al. | 705/51 |
| 2004/0117503 A1 * | 6/2004 | Nguyen et al. | 709/238 |
| 2005/0036445 A1 * | 2/2005 | Chien-Hsin | 370/229 |
| 2006/0164984 A1 * | 7/2006 | Rao et al. | 370/230 |
| 2006/0182109 A1 * | 8/2006 | Melsen et al. | 370/390 |
| 2006/0184685 A1 * | 8/2006 | Blasingame | 709/231 |
| 2007/0195772 A1 * | 8/2007 | Shadish | 370/390 |
| 2008/0137682 A1 * | 6/2008 | Kish et al. | 370/432 |

FOREIGN PATENT DOCUMENTS

WO     WO 2004051926     6/2004

OTHER PUBLICATIONS

Deering, S., Host Extensions for IP Multicasting, Network Working Group, Aug. 1989.
(Jack Y. B. Lee, et al.), "Design, Performance Analysis, and Implementation of a Super-Scalar Video-on-Demand System", vol. 12, No. 11, Nov. 2002, pp. 983-997.
(Alcatel), "Delivery of Broadcast TV Over a VPLS Based Multicast Solution", Dec. 2, 2004, XP001237249.
(Chunglae Cho, et al.) "Improvement of Channel Zapping Time in IPTV Services Using the Adjacent Groups Join-Leave Method", vol. 2, Feb. 9, 2004, pp. 971-975.

* cited by examiner

Primary Examiner—Zarni Maung

(57) ABSTRACT

The multimedia content delivery system is a low-cost enabler for many MPEG-based applications enabling the subscribers to play multicast MPEG streams. A plurality of files with MPEG encoded multimedia content are stored at a server and streamed to the subscribers using a multithreaded processing system (or MPEG sender). The sender operates in a snoop mode or in an open loop mode. In the snoop mode, a main thread performs an IGMP snoop looking for membership reports (leave, join, change channel), and configures a plurality of sender threads based on these reports. Each sender thread transmits a multicast data stream with encoded multimedia content from a respective file to a corresponding multicast address. In the open loop mode, the sender transmits multicast data streams to all multicast addresses continuously.

19 Claims, 4 Drawing Sheets

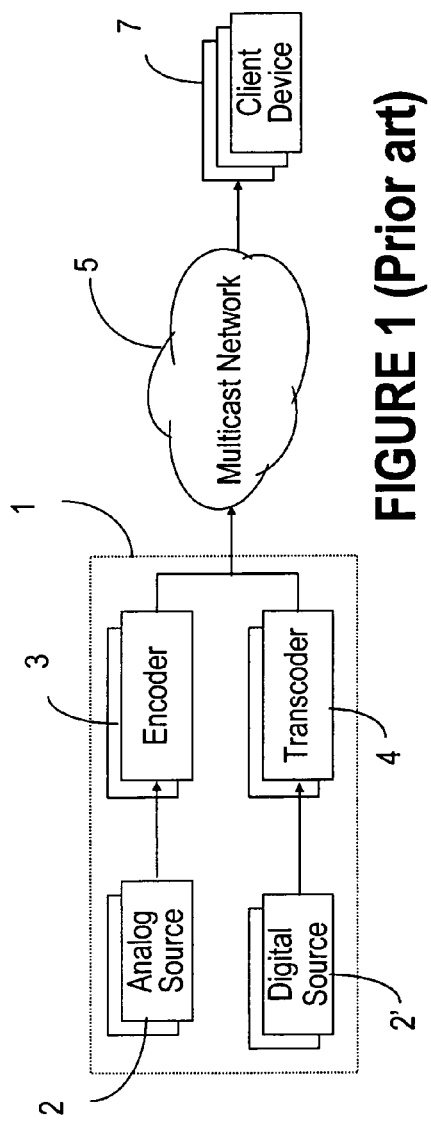
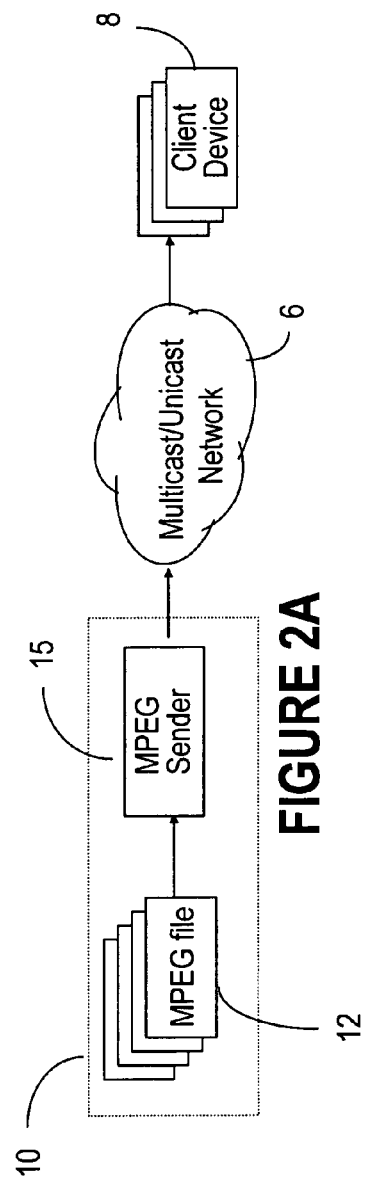
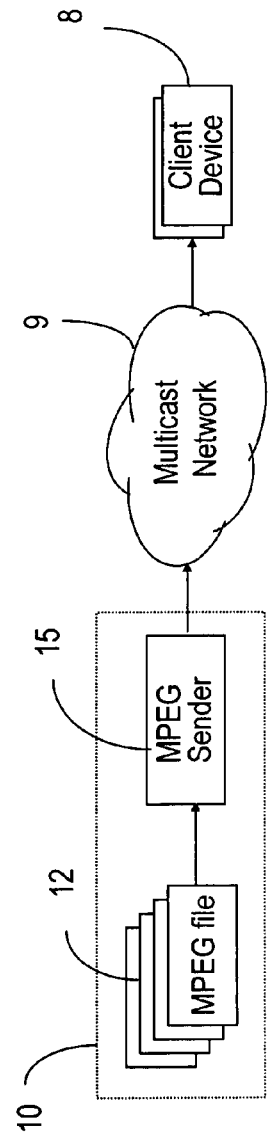
FIGURE 1 (Prior art)
FIGURE 2A
FIGURE 2B

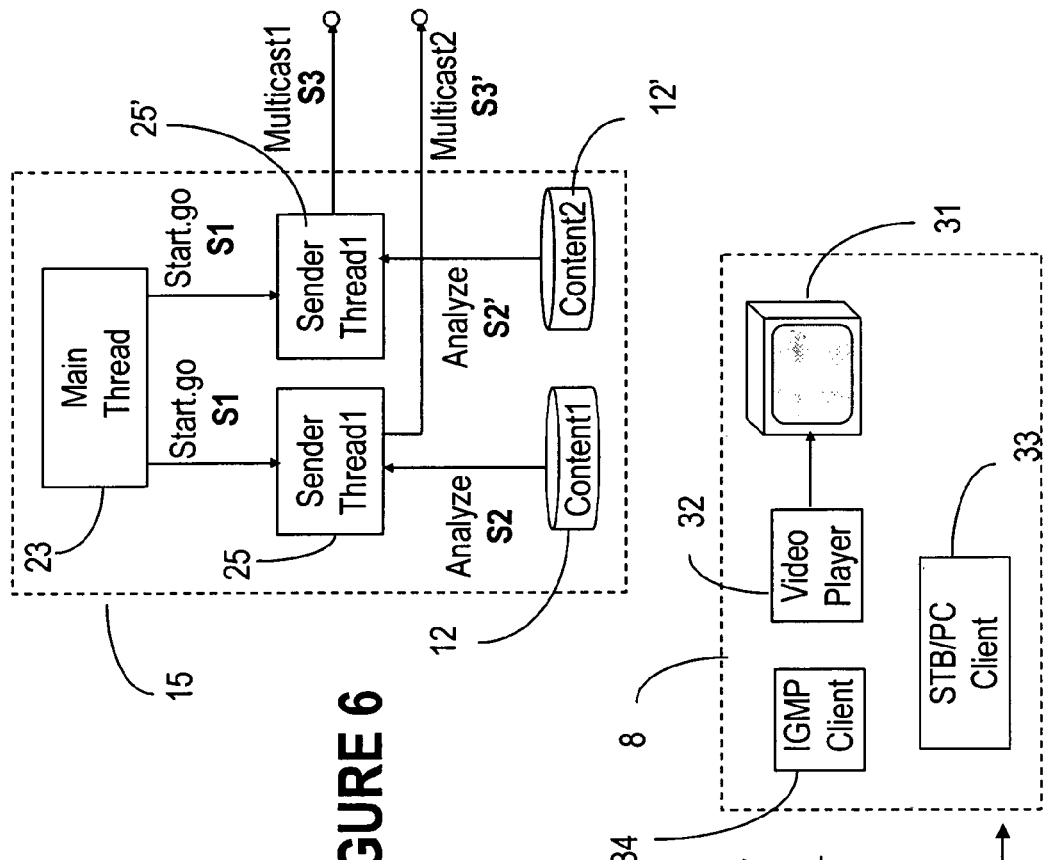
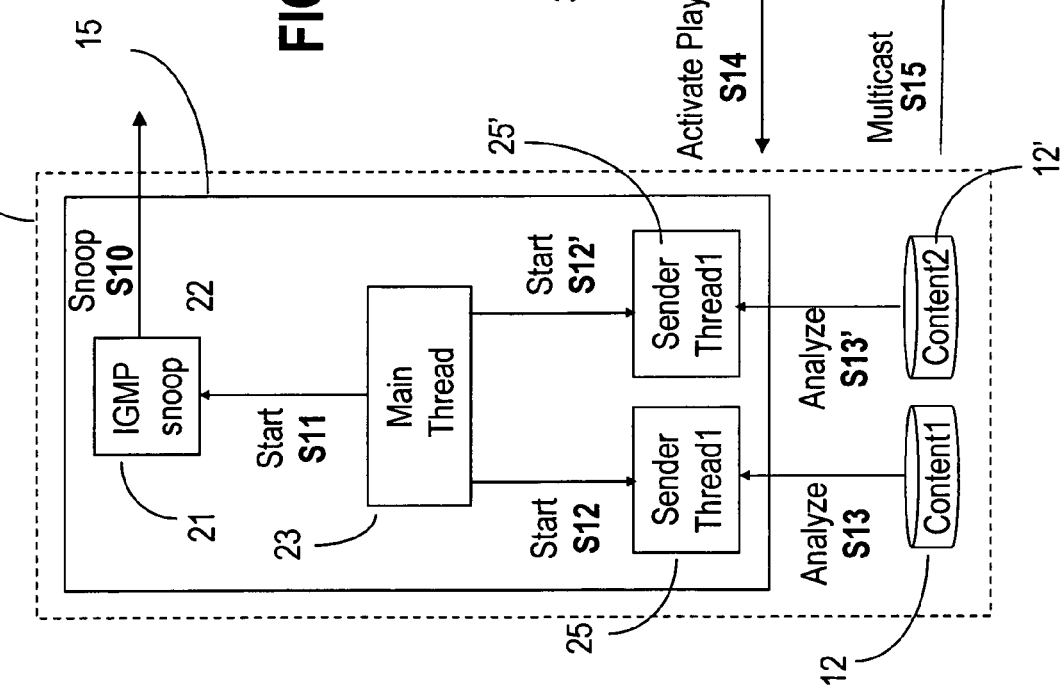

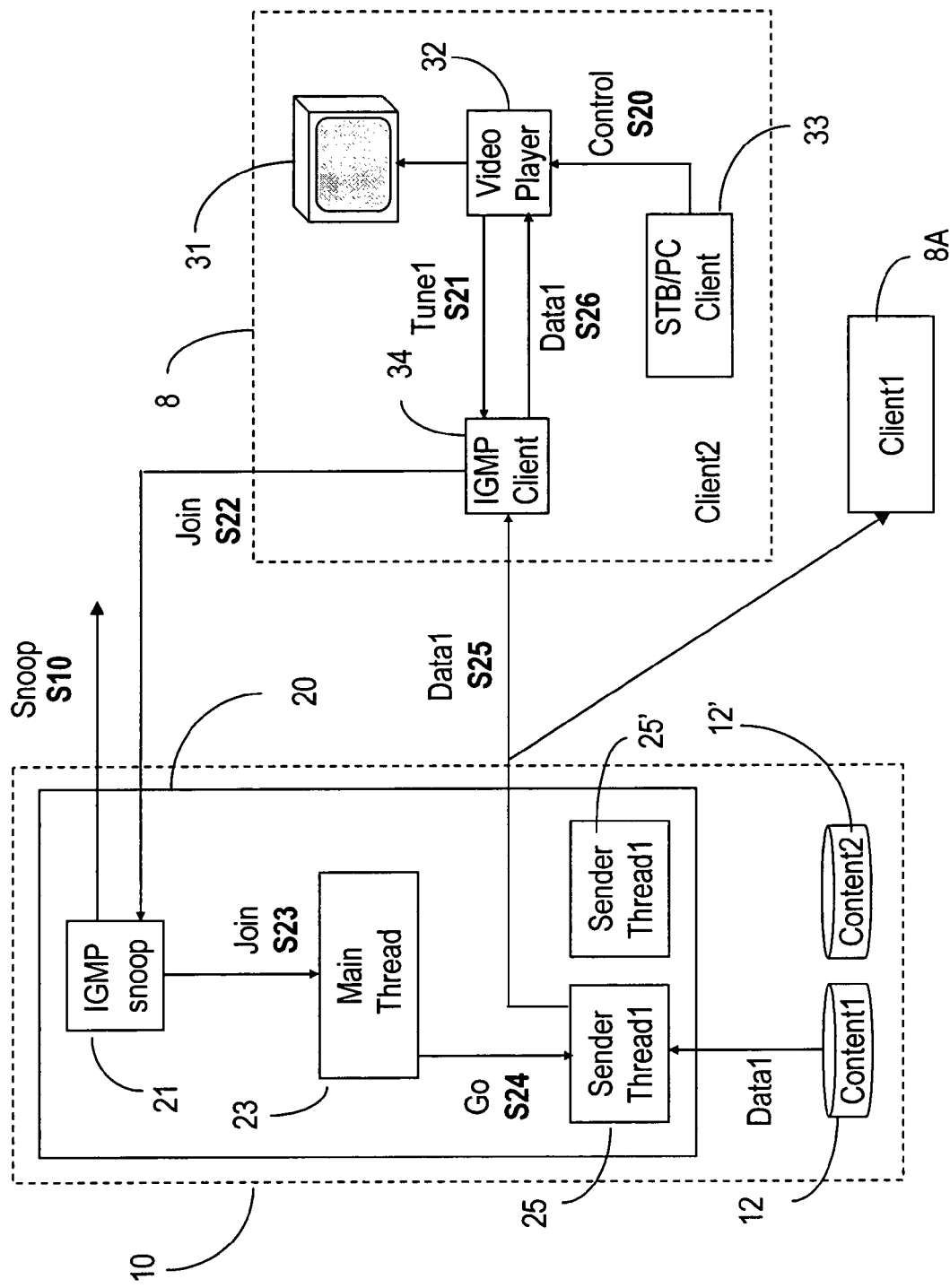

MULTIMEDIA CONTENT DELIVERY SYSTEM

FIELD OF THE INVENTION

The invention is directed to communication networks and in particular to a multimedia distribution system for broadcasting streaming multimedia content to a variety of video terminals and platforms.

BACKGROUND OF THE INVENTION

Because media files tend to be large and the duration of a download can be very large, transmission or storage of video media uses video streaming. Video streaming is achieved by multiplexing and synchronizing coded video, audio and associated information into a single bit stream or multiple bit streams. Streaming enables real-time delivery of the content, since the beginning of the stream can be played before the entire stream has been delivered. To view the content, the user terminal lodges a request to the source of the stream, which commences delivering the stream at a carefully controlled rate. The user terminal buffers the content file for a short time and then plays the file as it arrives.

Prior to streaming, the content must be encoded, a process which accomplishes: a) conversion of the content from analog to digital form, if necessary; b) creation of a content file in a format recognized by the streaming media server and player; then c) compression of the content file to minimize the bandwidth necessary for transmission from the server to the client; while d) adopting a bit rate at which the content is to be delivered. Service providers typically choose to encode content at multiple rates for enabling access to a variety of subscribers, according to the capabilities of their equipment.

The head-end of the current video delivery systems has in general a complex structure, as for example shown in the U.S. Pat. No. 6,401,243 (Sony Corporation) issued on Jun. 4, 2002. The head-end equipment generally includes a plurality of multimedia sources and means for encoding the data from the sources into streams. In many cases, the head-end includes both analog and digital sources. A digital source requires a transcoder for video codification of the source data into a multicast or unicast stream. An analog source requires an encoder for converting the analog signal (such as a TV signal) into a digital one and to encode it according to the streaming format. The sources may be real-time sources of analog video data such as a TV antenna, or video-on-demand sources such as servers storing compressed multi-media data, or a video tape library, etc. In this case, additional equipment is necessary for performing the recording and reading of the respective data.

For large amounts of data to be distributed to a large number of subscribers, IP multicast is more efficient than normal Internet transmissions because a server can broadcast data/messages to many recipients simultaneously. Unlike traditional Internet traffic that requires separate connections for each source—destination pair, IP multicasting allows many recipients to share the same source. This means that just one set of packets is transmitted for all destinations. To receive a multicast, a subscriber listens to a specific IP address on a multicast-enabled network, like tuning a television to a specific channel.

Internet Group Management Protocol (IGMP) is defined in RFC 1112, 2236, 3376 as the Internet standard for IP multicasting. IGMP establishes host memberships in particular multicast groups on a single network and allows a host to inform its local router that it wants to receive data addressed to a specific multicast group. Multicast broadcast is particularly suitable for distribution of multimedia (video, audio, data) content.

The IGMP protocol uses a "snoop mechanism" to prevent flooding. Flooding refers to broadcasting multicast traffic to all ports of a router/switch, which is normally done in the absence of such a mechanism. A layer-2 switch or a router adapted to run IGMP snooping functions examines the conversations occurring between hosts and routers, including queries and responses, to learn which ports to send multicast traffic to.

In other words, routers/switches use IGMP to ask hosts which multicasts they wish to receive. Hosts use IGMP to inform routers which multicasts they wish to receive. When a switch is placed between a host and a router, it can see which port a router is connected to, and which ports have devices connected to them that wish to receive multicast traffic. Using this information, a switch can configure its forwarding database to send multicast traffic to the ports connected to hosts that want to receive the multicast traffic. Multicast traffic is not sent to ports that do not have any connected devices that want to receive the multicast data.

Routers that support IGMP snooping send out messages on a periodic basis to query which hosts want to receive multicast traffic. The messages generated by the hosts, called membership reports or requests, provide requests for specific multicasts. IGMP snooping examines the reports and either enables or disables forwarding of that particular multicast. Examining the multicast address sent by the host enables IGMP snooping to provide automatic fine tune control that directs only the requested multicast traffic to the host, rather than all the multicast traffic.

Cessation of replies or membership reports from the hosts is generally an indication that the respective host does not wish to continue to receive multicast traffic. Hosts can also use an explicit leave message to indicate that they do not wish to listen to a multicast group. If all hosts on a particular port do not wish to receive particular multicast traffic, then that port is removed from the set of ports to which that particular multicast traffic is forwarded.

MPEG (Motion Picture Experts Group) is a working group of ISO/IEC in charge of the development of standards for digital audio and video; the term is also used to designate a respective standard. For example, MPEG2-based digital television standard defines formats for cable, satellite, and terrestrial video broadcast. MPEG enables a condensed transformation of digital video and audio signals for facilitating distribution of content files over a network. Technically, to obtain a MPEG stream, discrete samples in a stream are transformed into a bit-stream of tokens, which is much smaller than the corresponding initial stream, since only data that has changed from second to second is captured in the MPEG stream instead of capturing all information in the initial stream. MPEG tells the decoder how to inverse-represent the compacted stream back into data resembling the original stream of un-transformed data so that the data may be heard and viewed in its normal form.

Since MPEG format is widely used for coded representation of digital audio and video, it is desirable to provide a system and method of distributing multimedia content that use the MPEG format.

Currently, MPEG multicast enabled products require expensive head-end and network components. MPEG software in current use requires multiple real-time MPEG encoder devices to stream live audio/video services directly to a router or a transport network. On the client side, IGMP is employed to request individual MPEG services which are then made available by the upstream router. This ensures that the network and clients are not flooded with undesirable data.

There is a need to provide a system and method of distributing multimedia content which does away with the costly network and head-end components (such as transcoders and encoders/decoders), which support IGMP functionality. There is also a need to provide a system and method of enabling multimedia content multicast transmission of MPEG streams to a variety of end-users, be these computers and platforms (i.e. Unix, PC, servers, Windows). Still further, there is a need to provide a system and method that enables management of the multimedia streams in a basic environment with constrained bandwidth.

SUMMARY OF THE INVENTION

It is an object of the invention to provide a method and apparatus for multicasting streamed multimedia content to end users, which alleviate totally or in part the drawbacks of the prior art systems and methods.

Accordingly, the invention provides a method of sharing multimedia content files among a plurality of subscriber terminals, comprising the steps of: a) storing at a server a plurality of multimedia content files, each file comprising encoded multimedia content; b) providing at the server a multithreaded processing system, for allocating an explicit thread process to each file; and c) monitoring, from the multithreaded processing system, broadcast of any multicast data stream with encoded multimedia content to one or more subscriber terminals; wherein a subscriber terminal requests a specified service from the server by issuing a membership report providing a corresponding multicast address for the subscriber terminal.

A multimedia content delivery system for enabling sharing multimedia content files among a plurality of subscriber terminals, comprising: means for storing a plurality of files, each file comprising an encoded multimedia content; and a data stream sender for operating in a snoop mode wherein the data stream sender transmits the multicast data streams with encoded multimedia content from a respective file to a corresponding multicast address on request, and for operating in an open loop mode wherein the data stream sender transmits the multicast data streams to the respective multicast addresses continuously.

By eliminating the need for expensive head-end equipment to perform MPEG multicasting, the invention is a low-cost enabler for many MPEG applications such as application targeted advertisements, training, virtual tours, games, pay-per-view content, streaming of popular content at the network edge, etc.

Still another advantage of the invention resides in the ability to manage the bandwidth by simulating a multicast enabled network on a local subnet, while serving as a faster, more efficient way of transmitting packets that contain audio and video information to subscribers.

The present invention also provides a method of security to stop pirating from data streams. In one embodiment, this mechanism takes real-time input from one multicast, applies transformations to it such as time-shifting, detection of stream milestones (for e.g. improving synchronization with a view to optimize channel change), extraction of stream data and/or access control for security and forwards the stream as a new stream upon authorized client request.

The security component is similar to what is discussed in the co-pending U.S. patent application Ser. No. 10/208,562, filed 30 Jun. 2002, entitled "Secure multicast flow", which is incorporated here by reference. Upon receiving an IGMP membership report (join) request from a client, the mechanism makes a determination as to whether the client is entitled to view the requested stream and acts accordingly, perhaps either proceeding with the join or ignoring the request.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1 illustrates a block diagram of a typical head-end for a multimedia distribution system;

FIG. 2A illustrates a multimedia distribution system according to an embodiment of the invention that operates in a snoop mode;

FIG. 2B illustrates a multimedia multicast distribution system according to another embodiment of the invention operating in an open loop mode;

FIG. 3 shows the operation of the system of FIG. 2A in an idle state;

FIG. 4 shows operation of the system of FIG. 2A in response to a "channel join" request;

FIG. 6 illustrates operation of the system of FIG. 2B.

DETAILED DESCRIPTION

Figure 5:
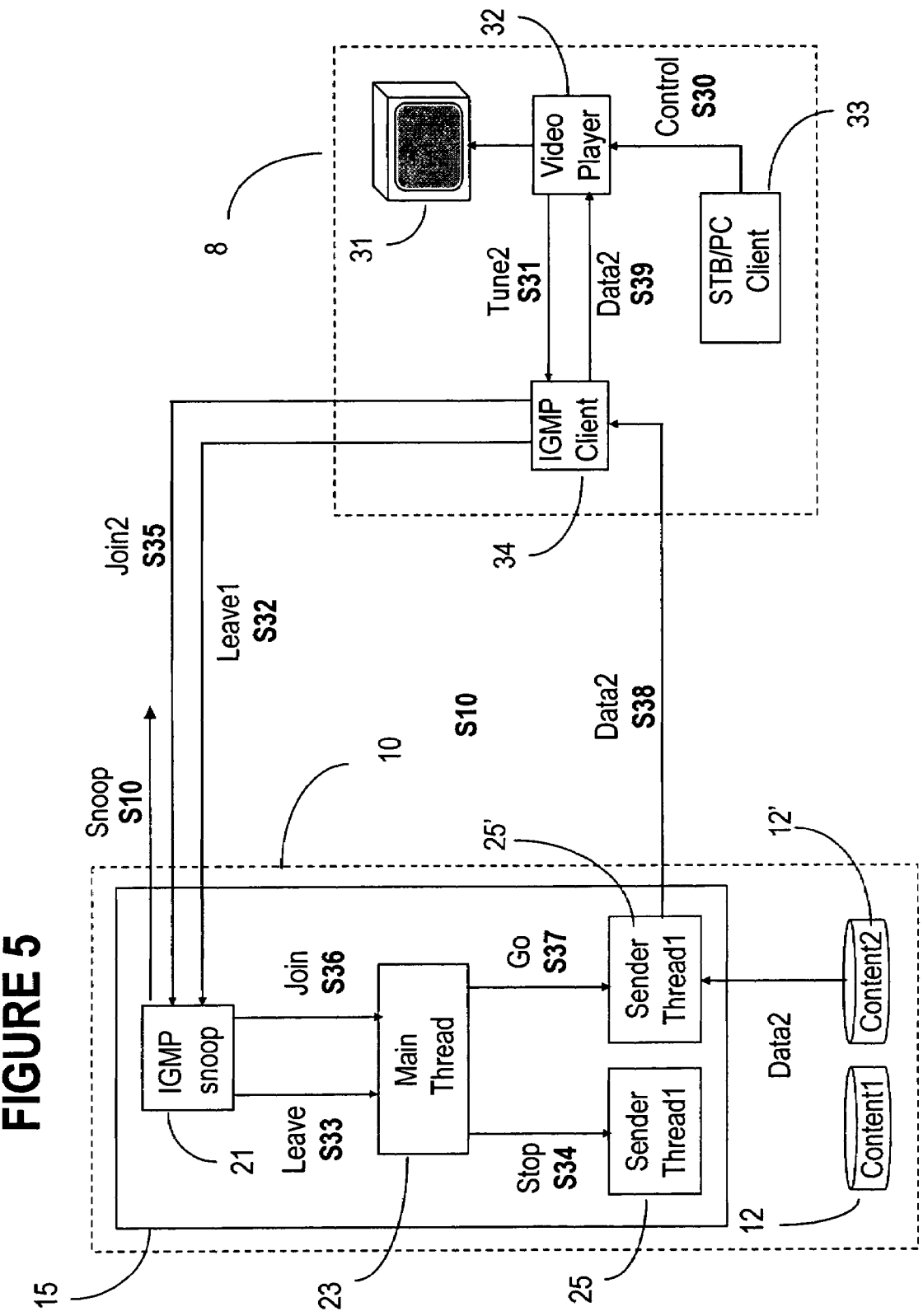
FIG. 5 shows operation of the system of FIG. 2A in response to a "channel change" request.

FIG. 1 illustrates an example of a video delivery system that multicasts multimedia content from a head-end 1 to a plurality of client devices 7. Generically, the head-end equipment includes the respective video sources, which can be a plurality of analog sources 2 and/or a plurality of digital sources 2'. The respective content is encoded (compressed) using e.g. MPEG encoders 3 in the case of analog sources, and e.g. MPEG transcoders 4 in the case of digital sources.

The MPEG streams are transmitted to the subscriber terminals 7 (also referred to as 'users' or 'clients') over a multicast network 5. Network 5 must support IP multicast, to enable a large number of users to view the same channel. In this current configuration, the head-end 1 serves client terminals 7 distributed over large geographical areas, over a large network 5. As known, the client devices 7 could be PCs enabled with video player capabilities, or TV sets with set-top boxes (STB).

Today's TV systems of the type shown in FIG. 1 are designed to have every channel a TV provider offers flow to each set-top box at the same time, ready for the viewer to select one. But with all of that programming on the cable into a home, cable operators can offer only a limited number of channels.

The system of the invention does away with that design. Only one channel (program) shoots into a set-top box at a time. When a viewer clicks to a new channel, the set-top box notifies a server 10 at the IPTV operator's facilities to instantly send a new stream of programming. This efficient design gives viewers no end of choices.

FIGS. 2B and 2A show two variants of the operation of the video delivery system according to the invention. In this embodiment, a server 10 maintains a plurality of MPEG files 12; the means storing the files are referred to with the same reference numerals with the files themselves, for simplicity Files 12 may be for example video-on-demand sources, or a video tape library, storing compressed multi-media data. Preferably, the invention uses the MPEG file formats.

A server 15 transmits a data string with content selected by a client terminal 8 that requested the respective file 12. As the files are preferably stored in MPEG format, server 15 is referred in the following as a MPEG sender 15. For example, the MPEG sender 15 accepts and delivers MPEG2 transport streams, but the mechanism need not necessarily be constrained to this format. MPEG sender 15 operates in a "snoop'mode" as shown in FIG. 2A, or in an "open loop mode", as shown in FIG. 2B In the snoop mode of operation illustrated in FIG. 2A, MPEG sender 15 'snoops' for identifying requests from client devices 8. Once a request for a certain file is identified, the file is transmitted as a mnulticast stream over network 6 to the respective client terminal(s). Any client terminal that wishes to view the same file will join or leave a multicast stream already in progress.

In the open loop mode of operation illustrated in FIG. 2B the MPEG sender 15 has no dependency on the client requests; it just multicasts constantly all files 12 as multicast strings. The client terminals join or leave the respective multicast string, as desired.

Assuming that the required content can be made available, the lightweight nature of the MPEG sender software allows it to be deployed close to the edge of the network to reduce latency, packet loss and bandwidth on the network backbone. Thus, a basic environment may be used for distribution of video services. Network 6 may be a LAN, running IP multicast in the case of the embodiment of FIG. 2B and either unicast or multicast in the case of the embodiment of FIG. 2A. The number of 'channels' available with system 10 is practically un-limited, i.e. is limited only by the selection offered by files 12. As also apparent, the system of FIG. 2B and 2A generates MPEG transport streams without requiring the deployment and configuration of MPEG encoders 3 of FIG. 1A.

The client devices 8 could be PCs enabled with video player capabilities, or TV sets with set-top boxes (STB). Most STBs provide support for MPEG2TS stream ingest over multicast IP. Open source software is available (www.videolan.org) on the PC client and on LINUX which can play multicast MPEG2TS streams.

FIG. 3 illustrates the operation of the MPEG sender 15 in the "snoop mode", idle state. As described in connection with FIG. 2A, the multimedia content files 12 are stored at server 15 in the respective compressed format. The MPEG sender 15 may be implemented in hardware (HW) or in software (SW). For example, if implemented in software, Java may be used for portability and ease of modification and upgrade. It operates as a multithreaded processing system, which allocates a thread to each stream, and each multimedia content file has a separate processing thread. A thread typically contains computer implementable instructions to control one or more electronic and mechanical media devices involved in a performance, here the storage means holding files 12. Each thread is configured as to which data file it is associated with, and what multicast address is to be used.

The IGMP snooping is written in C language to provide that mechanism. It is to be noted that the entire sender SW may be written in C for performance reasons; obviously other programming languages may be used as they are developed or adapted for this application.

By combining the IGMP snooping with MPEG streaming, the system of the invention creates an IGMP controlled multicast video server that can emulate a multicast video head-end or serve as a multicast VOD (video-on-demand) source. Also the invention is capable of accurately streaming a constant bit rate (CBR) MPEG stream, emulating a video-pump.

In the idle state illustrated in FIG. 3, the sender 15 is blocked, waiting for IGMP membership reports (or requests) by sending out messages on a periodic basis, as shown at S10. The snooping messages query which client terminals want to receive multicast traffic. Once such a request is received, the IGMP snooping 21 examines the requested multicast and starts a main thread 23, shown by step S11.

The MPEG Sender is configured at startup to associate filenames with specific multicast addresses. The IGMP membership report message specifies the multicast address (including the port on the access router) to send the file on.

The main thread 23 then enables forwarding of that particular multicast stream, by instructing a sender thread, such as sender thread denoted with 25, to start. This step is denoted with S12. Additional sender threads, such as 25' may also be started on request from hosts 8, step S12', for different streams. The number of sender threads is determined based on how many files and matching multicast addresses are specified for the respective MPEG sender 15. Since the data is multicast, one thread can service many client terminals.

On receipt of a start-up request, threads 25, 25' analyze the first part (for example approximately 1 Megabyte) of a respective file 12, as shown in step S13, S13' to determine the bit rate for that stream. Server 10 determines the interface to send the file from the multicast address of the client terminal, and sets stream parameters, such as block size in the stream, the packet delay, TTL (time to live), and information regarding the transmit mode, which is in this case the snoop mode. When a sender thread is started, by the client terminal activating e.g. a "play" control as shown by step S14, the respective file is streamed to the associated multicast address for delivery to the client terminals, step S15. The sender threads keep the flow of packets coordinated with the passage of time based on the send bit rate, which is presumed constant.

The client side of the video delivery system of the invention includes a set-top box or personal computer (PC) 33, a video player 32 and a video display 31 that enable a subscriber to view and listen to the multimedia content streamed from server 10. The client terminal 8 also comprises an IGMP client 34 that informs the respective router (not shown) which files 12 client terminal 8 wishes to receive; it also issues join and leave requests, as seen later. As indicated above, the main thread 23 of server 10 checks (snoop thread) for membership reports (joins, leaves and channel change,) issued by the IGMP client 34.

FIG. 4 shows operation of the system of FIG. 2A in response to a "channel join" request. Let's assume that the main thread 23 started a sender thread 25 for streaming content file 12 (Data1) to a client terminal 8A. Let's also assume that a client terminal 8 wishes to join the Data1 stream. The STB/PC client 33 controls the video player, as shown by step S20 to tune on the channel carrying Data1 stream, as shown by step S21. The snoop thread continues to listen for membership reports, as shown before in step S10, receives a join request, step S22, and signals the main thread 25 that a join request was received, step S23.

The main thread examines the join request and signals the correct sender thread to go, as seen in step S24. The sender thread commences reading and sending data at the predetermined rate, step S25. The IGMP client 34 now receives the stream Data1, as shown by step 26. The sender threads also wait for stop commands, and once stopped, wait to be started. When a leave report is detected by the IGMP snoop 21, the main thread instructs the respective sender thread 25, 25' to stop.

FIG. 5 shows operation of the system of FIG. 2A in response to a "channel change" request. As before, let's assume that the main thread 23 started a sender thread 25 for streaming content file 12 (Data1) to a client terminal 8. Let's also assume that client terminal 8 wishes to leave the Data1 stream and join another stream, namely a Data2 stream. The STB/PC client 33 controls the video player, as shown by step S30 to tune the video player 32 on the channel carrying Data2 stream, as shown by step S31, which means automatically that the client terminal wishes to leave stream Data1. The snoop thread, which continues to listen for membership reports as seen in step S10, receives the leave request, step S32, and signals the main thread 25 that a leave request was received, step S33.

The main thread examines the leave request and signals the correct sender thread, here thread 25 to stop, as seen in step S34. The sender thread stops streaming Data1 to client terminal 8. A join request received as shown in step S35 by "Join2" is handled as in FIG. 4, and as shown by steps S36 and S37. The IGMP client 34 now receives the stream Data2, as shown by step S38.

FIG. 6 illustrates the operation of the MPEG sender 15 in the "open loop mode". As described in connection with FIG. 2B, the multimedia content files 12 are stored at server 15 in the respective compressed format. In operation, the system maintains a main thread 23 which supports one or more sender threads 25, 25', each for a respective file 12. On start-up, as shown by start.go step S1, S1', each thread 25, 25' analyzes its file to determine the optimal video delivery data rate for the respective stream, as seen in step S2, S2'. This enforces the dependency on the MPEG single program transport stream (SPTS) format in the file. It is possible to specify a global inter-packet delay time at startup of MPEG sender to avoid this step.

All streams are sent constantly, as shown by step S3, S3'; whenever a thread reaches the end of the respective file, it immediately restarts at the beginning of the file. In this scenario a multicast-enabled switch (not shown) is required to forward the appropriate multicasts to the appropriate destinations.

It is to be noted that the client terminal/s is/are not illustrated on this drawing for this mode of operation. Since the sender 15 has no dependency on the client terminals, it starts up all threads and tells them all to send constantly.

I claim:

1. A method of sharing multimedia content files among a plurality of subscriber terminals, comprising the steps of:
   a) storing at a server a plurality of multimedia content files, each file comprising encoded multimedia content;
   b) providing at said server a multithreaded processing system, for allocating an explicit thread process to each said file; and
   c) monitoring, from said multithreaded processing system, broadcast of any multicast data stream with encoded multimedia content to one or more subscriber terminals; and
   a subscriber terminal requesting a specified service from said server, the service providing a stream of encoded multimedia content from a content files among the plurality of files, by issuing a membership report having a corresponding multicast address for said subscriber terminal.

2. The method of claim 1, wherein said providing provides a multithreaded processing system capable of operating in a snoop mode, for transmitting said multicast data stream on said corresponding multicast address on request, and capable of operating in an open loop mode for transmitting all said multicast data streams on respective multicast addresses continuously.

3. The method of claim 2, step b) comprises, in the snoop mode,
   starting from a main thread a snoop thread for detecting any membership report issued by said plurality of subscriber terminals; and
   at said snoop thread, examining each said membership reports and either enabling or disabling forwarding of a particular multicast data stream, accordingly.

4. The method of claim 3, wherein a first membership report indicates that a first subscriber terminal requests a specified encoded multimedia content on a first multicast address.

5. The method of claim 4, wherein, wherein step c) comprises:
   c1) configuring from said main thread a first sender thread on receipt of said first membership report, said first sender thread being associated with a first file storing encoded multimedia content specified in said first membership report; and
   c2) starting said first sender thread for streaming to said first multicast address a first multicast data stream with encoded multimedia content from said first file.

6. The method of claim 5, wherein step c1) comprises:
   analyzing a part of said first file and setting the stream parameters for said first multicast data stream accordingly; and
   identifying an interface on said server to send said first multicast data stream from, using said first multicast address.

7. The method of claim 6, wherein said stream parameters include the stream bit rate for enabling said first sender thread to keep the flow of packets in said first multicast data stream coordinated with the passage of time.

8. The method of claim 7, wherein said stream parameters further include block size in the stream, the packet delay and the time to live (TTL).

9. The method of claim 4, wherein a second membership report is a join request for instructing said server to enable a second subscriber terminal to receive said first multicast data stream.

10. The method of claim 9, wherein step c) comprises:
    signaling said main thread from said snooping process that said join request was received;
    at said main thread, examining said join request and identifying that a first sender thread already transmits said first multicast data stream;
    signaling said first sender thread that said second subscriber terminal requests to join said first multicast data stream already in progress; and
    at said first sender thread, joining said second subscriber terminal to said first multicast address to receive said first multicast data stream.

11. The method of claim 4, wherein said membership report is a leave request for instructing said server to disconnect a second subscriber terminal from receiving said first multicast data stream.

12. The method of claim 11, wherein step c) comprises:
    signaling said main thread from said snooping process that said leave request was received;
    at said main thread, examining said leave request and identifying that said first sender thread transmits said first multicast data stream to said second subscriber terminal;
    signaling said first sender thread that said second subscriber terminal requests to leave said first multicast data stream in progress; and at said first sender thread, disconnecting said subscriber terminal from said specific multicast address for disabling receipt of said multicast data stream.

13. The method of claim 4, wherein said membership request includes a channel change request for instructing said server to disconnect said first subscriber terminal from receiving said first multicast data stream and enable said first subscriber terminal to join a second multicast data stream already in progress.

14. The method of claim 13, wherein step c) comprises:
signaling said main thread from said snooping process that said channel change request was received;
at said main thread, examining said channel change request and identifying said first sender thread that transmits said first multicast data stream and further identifying a second sender thread that transmits said second multicast data stream;
signaling said first sender thread that said subscriber terminal requests to leave said first multicast data stream and disconnecting said subscriber terminal from said first multicast address for disabling receipt of said first multicast data stream; and
signaling said second sender thread that that said second subscriber terminal requests to join said second multicast data stream and joining said subscriber terminal to a second multicast address to receive said second multicast data stream.

15. A multimedia content delivery system for enabling sharing multimedia content files among a plurality of subscriber terminals, comprising:
means for storing a plurality of files, each file comprising an encoded multimedia content, and each file being associated with a corresponding multicast address; and
a data stream sender for streaming to each multicast address a respective multicast data stream with encoded multimedia content from a respective file,
wherein said data stream sender is capable of operating in a snoop mode of operation said wherein the data stream sender transmits said multicast data streams to said corresponding multicast address on request, and is capable of operating in an open loop mode of operation wherein said data stream sender transmits said multicast data streams to said respective multicast addresses continuously.

16. The system of claim 15, wherein said data stream sender is a multithreaded processing system, comprising:
a main thread for activating a snoop process during said snoop mode, for detecting membership reports from subscriber terminals;
a plurality of sender threads, each sender thread for configuring a respective multicast data stream from encoded multimedia content in a file specified in said membership report and streaming said respective multicast data stream from said file to said corresponding multicast address under control of said main thread,
wherein said main thread is capable of instructing said sender threads to start or stop streaming said multicast data stream based on said membership reports.

17. The system of claim 16, wherein said membership reports include one of a join request, leave request and change channel request.

18. The system of claim 15, wherein said multicast data streams are MPEG (Motion Picture Experts Group) streams and said snoop process uses IGMP (Internet Group Management Protocol).

19. The system of claim 15, wherein said snoop mechanism comprises a snoop server on said data stream sender controlled from a snoop client on each subscriber terminal.

* * * * *